(12) United States Patent
Paik et al.

(10) Patent No.: US 8,644,604 B2
(45) Date of Patent: Feb. 4, 2014

(54) APPARATUS AND METHOD FOR ALIGNING COLOR CHANNELS

(75) Inventors: Joon-Ki Paik, Seoul (KR); Jin-Hee Lee, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 89 days.

(21) Appl. No.: 13/356,842

(22) Filed: Jan. 24, 2012

(65) Prior Publication Data

US 2012/0189195 A1 Jul. 26, 2012

(30) Foreign Application Priority Data

Jan. 24, 2011 (KR) .................. 10-2011-0006926

(51) Int. Cl.
*G06K 9/34* (2006.01)
(52) U.S. Cl.
USPC ............................ 382/164; 382/162; 382/167
(58) Field of Classification Search
USPC .......... 382/159, 162, 164, 167; 358/409, 518; 346/140.1; 347/43; 345/549, 589
See application file for complete search history.

(56) References Cited

U.S. PATENT DOCUMENTS

| | | | | |
|---|---|---|---|---|
| 6,057,865 | A * | 5/2000 | Hawkins | 346/140.1 |
| 7,457,458 | B1 * | 11/2008 | Daniel et al. | 382/159 |
| 7,852,531 | B2 * | 12/2010 | Nacman et al. | 358/518 |
| 7,940,280 | B2 * | 5/2011 | Sellers et al. | 345/589 |

* cited by examiner

*Primary Examiner* — Anh Do
(74) *Attorney, Agent, or Firm* — William Park & Associates Patent Ltd.

(57) ABSTRACT

Provided are an apparatus and method for aligning color channels on the basis of depth information on an image taken by an imaging device equipped with a multiple color-filter aperture (MCA). An image divider generates a binary image including edge information on an original image, and generates a label map including a plurality of regions of interest (ROIs) respectively corresponding to a plurality of objects included in the original image. A shifting vector estimator estimates color shifting vectors (CSVs) indicating shift directions and distances of color channels of the original image according to the respective ROIs. A channel matching unit obtains a plurality of matched images corresponding to the respective ROIs included in the label map by shifting the color channels according to the respective CSVs, and generates a multi-focus image by combining the matched images.

11 Claims, 14 Drawing Sheets
(13 of 14 Drawing Sheet(s) Filed in Color)

(a)      (b)    (c)        (d)

(a) (b) (c)

(a) (b)

(c) (d)

FIG. 15
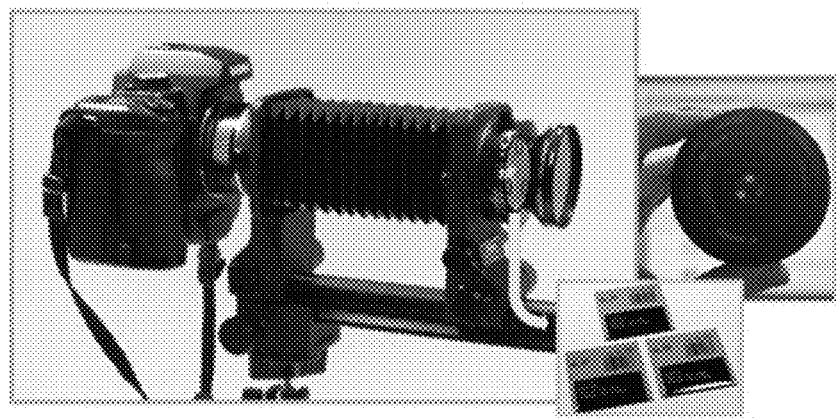
FIG. 16
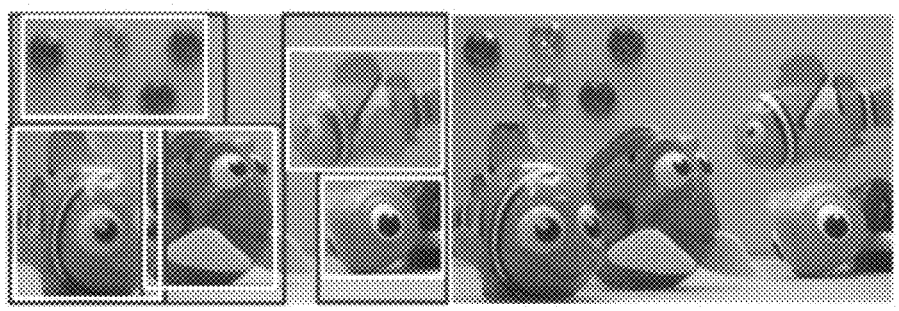
(a)                  (b)
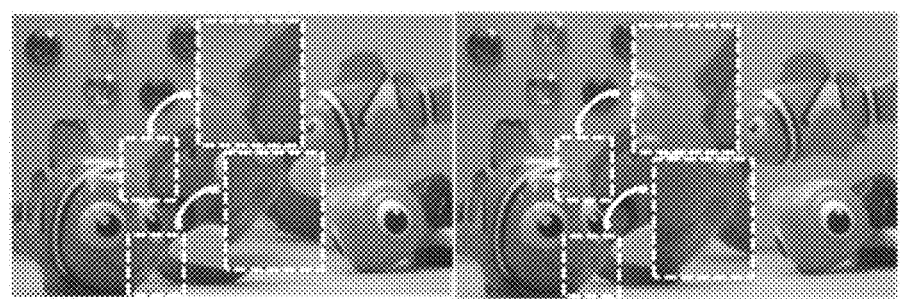
(c)                  (d)

APPARATUS AND METHOD FOR ALIGNING COLOR CHANNELS

CROSS-REFERENCE TO RELATED APPLICATION

This application claims priority to and the benefit of Korean Patent Application No. 2011-0006926, filed on Jan. 24, 2011, the disclosure of which is incorporated herein by reference in its entirety.

BACKGROUND

1. Field of the Invention

The present invention relates to an apparatus and method for aligning color channels on the basis of depth information on an image taken by an imaging device equipped with a multiple color-filter aperture (MCA), and more particularly, to an apparatus and method capable of generating a multi-focus image by correcting focuses of color channels of an image obtained by a plurality of color filters.

2. Discussion of Related Art

Image registration is a fundamental problem in image processing and computer vision fields. Among various application fields, obtainment of high-quality color images requires accurate and non-rigid registration between color channels. More specifically, color shapes can be obtained by a digital method using one of spectral sampling, spatial sampling, and temporal sampling.

In a spectral sampling system, incident light is split according to wavelength using section-specific prisms and three image sensors, and three color channels generate a perfect color image through mechanical or electronic alignment. A spatial sampling system utilizes a color filter array and a single two-dimensional image sensor, and color information lost by spatial sampling is restored by an interpolation technique referred to as demosaicing.

Meanwhile, a temporal sampling technique is used in a high-resolution device for, for example, sequential endoscopic images. Since respective image frames are obtained under different color illuminations, only one color channel is sampled from each frame. The entire color image sequence is restored by temporal interpolation requiring non-rigid alignment between color channels. In addition to temporal sampling of a high-resolution color image, an image signal processing (ISP) system of a current digital camera and a next-generation video coding system require a real-time rigid image registration technique.

A simple and intuitive image registration technique is performed by minimizing the sum of squared difference (SSD) between color channels. However, SSD-based registration has a high chance of failure because the same pixel has different pixel values in respective color channels. Recent research assumes that there is a constant relationship between pixel values in a color space, and such an assumption has become a theoretical basis of a mutual information-based registration technique.

Lately, a non-rigid registration technique using a joint histogram between color channels has been proposed for a temporally sampled medical image sequence. Such a method is only used in a main part to reduce the load of calculation, but is not appropriate to be applied to a digital camera or video coding system.

SUMMARY OF THE INVENTION

The present invention is directed to an apparatus and method for aligning color channels on the basis of depth information on an image taken by an imaging device equipped with a multiple color-filter aperture (MCA) in a multi-focus system based on a single camera, wherein the image taken by the device equipped with the MCA is divided into a plurality of uniform depth regions and color shifting vectors (CSVs) between color channels of each region are automatically estimated to align the color channels.

The present invention is also directed to a computer-readable recording medium storing a program for executing, in a computer, a method of aligning color channels on the basis of depth information on an image taken by an imaging device equipped with an MCA in a multi-focus system based on a single camera, wherein the image taken by the device equipped with the MCA is divided into a plurality of uniform depth regions and CSVs between color channels of each region are automatically estimated to align the color channels.

According to an aspect of the present invention, there is provided an apparatus for aligning color channels on the basis of depth information on an image taken by an imaging device equipped with an MCA, the apparatus including: an image divider configured to generate a binary image including edge information on an original image taken by the imaging device having different color filters respectively installed in a plurality of openings formed in the MCA, label respective components including pixels connected with each other in the binary image, and thereby generate a label map including a plurality of regions of interest (ROIs) respectively corresponding to a plurality of objects included in the original image; a shifting vector estimator configured to estimate CSVs indicating shift directions and distances of color channels of the original image according to the respective ROIs on the basis of frequency components of image data constituting the respective ROIs; and a channel matching unit configured to obtain a plurality of matched images corresponding to the respective ROIs included in the label map by shifting the color channels according to the respective CSVs, and generate a multi-focus image focusing on all the plurality of objects included in the original image by combining the matched images.

According to another aspect of the present invention, there is provided a method of aligning color channels on the basis of depth information on an image taken by an imaging device equipped with an MCA, the method including: an image division step of generating a binary image including edge information on an original image taken by the imaging device having different color filters respectively installed in a plurality of openings formed in the MCA, labeling respective components including pixels connected with each other in the binary image, and thereby generating a label map including a plurality of ROIs respectively corresponding to a plurality of objects included in the original image; a shifting vector estimation step of estimating CSVs indicating shift directions and distances of color channels of the original image according to the respective ROIs on the basis of frequency components of image data constituting the respective ROIs; and a channel matching step of obtaining a plurality of matched images corresponding to the respective ROIs included in the label map by shifting the color channels according to the respective CSVs, and generating a multi-focus image focusing on all the plurality of objects included in the original image by combining the matched images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will become more apparent to those of ordinary skill in the art by describing in detail exemplary embodiments thereof with reference to the accompanying drawings, in which:

FIG. 15 shows an actual MCA camera used in an experiment for evaluating performance of the present invention;

FIG. 16 shows experimental results obtained using a digital single lens reflex (DSLR)-A camera.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
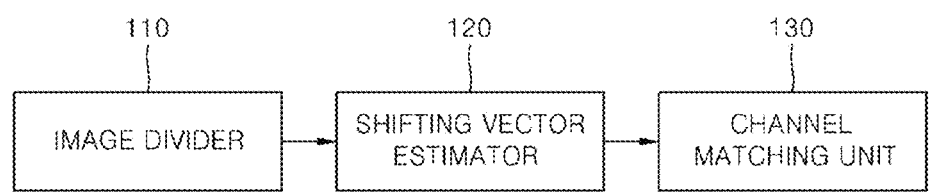
FIG. 1 is a block diagram of an apparatus for aligning color channels on the basis of depth information on an image taken by an imaging device equipped with a multiple color-filter aperture (MCA) according to an exemplary embodiment of the present invention.

FIG. 1 is a block diagram of an apparatus for aligning color channels on the basis of depth information on an image taken by an imaging device equipped with a multiple color-filter aperture (MCA) according to an exemplary embodiment of the present invention.

Referring to FIG. 1, an apparatus for aligning color channels according to an exemplary embodiment of the present invention includes an image divider 110, a shifting vector estimator 120, and a channel matching unit 130. The apparatus for aligning color channels according to an exemplary embodiment of the present invention is used to align color channels of an original image taken by a camera equipped with an aperture in which a plurality of color filters are installed. Such a camera will be referred to as an MCA camera below. In the aperture of an MCA camera, a plurality of openings are formed, and red, green and blue color filters are installed in the respective openings. Using the aperture in which the plurality of color filters are installed as mentioned above, the MCA camera measures depths of objects present at different distances from the camera, and sets multiple focuses.

Photography light of an object transmitted through the color filters of the aperture forms an image, thereby generating an original image. A convergence pattern of photography light varies according to red (R), green (G) and blue (B) color channels extracted from the original image. Also, the respective color filters are present at different positions in the aperture, and thus convergence patterns of photography light are formed at different positions in the original image generated by the photography light passed through the respective color filters.

A color image taken by an MCA camera as described above has the problem of misalignment of color channels, which is caused by chromatic aberration of an optical system, temporal sampling of a high-resolution color image sequence, and depth-based color shifting in the MCA camera. In general, color misalignment occurs in a spatially variable way and requires non-rigid alignment between color channels.

Figure 2:
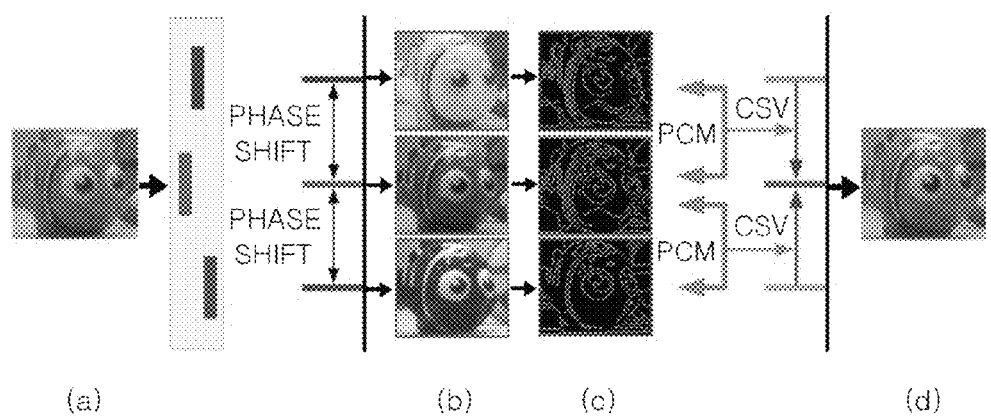
FIG. 2 shows a part of a color image in which a uniform color shift is shown between color channels.

FIG. 2 shows a part of a color image in which a uniform color shift is shown between color channels. (a) of FIG. 2 shows a part of an original image in which a color shift has occurred, and (b) shows images corresponding to R, G and B color channels. After binarizing the original image as shown in (c) of FIG. 2 to generate binary images corresponding to the respective color channels of the original image, the apparatus for aligning color channels according to an exemplary embodiment of the present invention estimates color shifting vectors (CSVs) of the respective color channels through phase correlation matching (PCM) and aligns the color channels using the estimated CSVs, thereby generating a multi-focus image in focus.

Specifically, a CSV between the R channel and the G channel and a CSV between the G channel and the B channel are estimated on the basis of one of the R, G and B color channels, for example, the G channel, and the R channel and the B channel are shifted with respect to the G channel according to the estimated CSVs, so that an image in focus is generated.

Although a shift between color channels shown in the whole original image is spatially variable, it is assumed that a uniform color shift occurs in a small region of the original image as shown in FIG. 2. Thus, the apparatus for aligning color channels according to an exemplary embodiment of the present invention divides the original image into a plurality of regions of interest (ROIs) corresponding to respective objects present at different distances in the original image, and estimates CSVs corresponding to the respective ROIs, thereby aligning color channels according to the respective ROIs.

After CSV estimation based on PCM, a method of dividing an original image into a plurality of ROIs and performing alignment of color channels will be described in detail below.

As mentioned above, estimation of CSVs for aligning color channels is based on PCM. A uniform shift between two images may be uniquely characterized by a phase shift in the frequency domain. The apparatus for aligning color channels according to an exemplary embodiment of the present invention estimates CSVs on the basis of the shift theorem of Fourier transform that states that a shift of spatial coordinates between two images is converted into a linear phase difference in the frequency domain. A G channel $f_G(x, y)$ and an R or B channel $f_C(x, y)$ of an original image are functions that are absolutely integrable in $R^2$ region, and are assumed to have a relationship shown in Equation 1 below.

$$f_G(x,y) = f_C(x-\Delta x, y-\Delta y), C \subset \{R,B\}$$ [Equation 1]

Here, (x, y) denotes a position of a pixel in an image, and ($\Delta x$, $\Delta y$) denotes a displacement between two images.

Next, the discrete Fourier transform (DFT) of an RGB color image is relatively shifted as shown in Equation 2 below.

$$F_G(u, v) \; F_C(u, v)\exp\left\{-j2\pi\left(\frac{u}{M}\Delta x + \frac{v}{M}\Delta y\right)\right\}$$ [Equation 2]

Thus, a normalized cross power spectrum is given as shown in Equation 3 below.

$$R(u, v) = \frac{F_G F_C^*}{|F_G F_C^*|} - \exp\left\{j2\pi\left(\frac{u}{M}\Delta x + \frac{v}{M}\Delta y\right)\right\}$$ [Equation 3]

The inverse Fourier transform of a complex exponential function is in the form of a shifted Kronecker delta function, and thus is expressed as shown in Equation 4 below.

$$r(x,y) = F^{-1}\{R(u,v)\} = \delta(x-\Delta x, y-\Delta y)$$ [Equation 4]

Such a result can be obtained through direct calculation of correlation functions. Since DFT and inverse Fourier transform are performed using fast Fourier transform (FFT) and only require calculation of 0 (MNlogMN) for an image having an M×N size, PCM is superior to a process of performing calculation of 0 ($M^2N^2$) for general DFT.

Binary edge images shown in (c) of FIG. 2 can be obtained by applying a window function and normalizing individual RGB pixel values. A normalization process reduces the noise effect of an image, and generates a binary edge image corresponding to the original image. Image binarization is a major preprocess for reducing the complexity of motion estimation. At this time, a variety of edge detection algorithms can be used. As an example, the Canny edge detection algorithm can be used to generate an edge image. The edge image is used to separate a background and object of the original image with a remarkably reduced amount of calculation.

Figure 3:
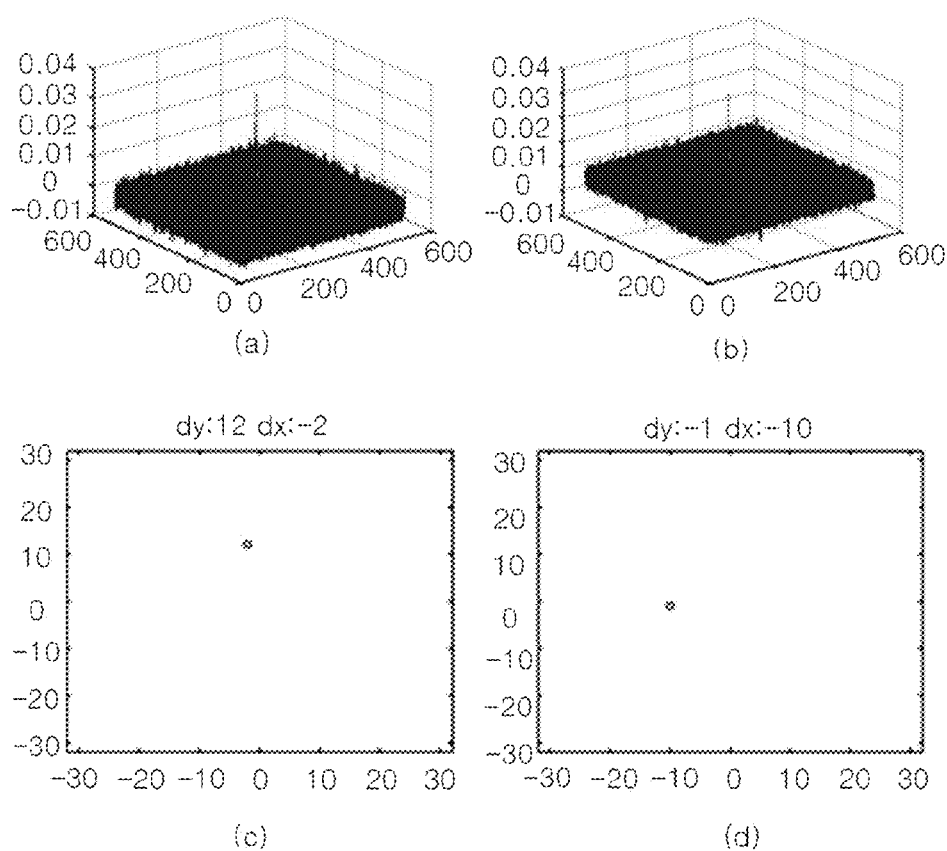
FIG. 3 illustrates an example of estimating a color shifting vector (CSV) through phase correlation matching (PCM) based on 2-bit transform.

FIG. 3 illustrates an example of estimating a CSV through PCM based on 2-bit transform. (a) of FIG. 3 shows a cross power spectrum between the R channel and the G channel of an image, and (b) shows a cross power spectrum between the R channel and the B channel. (c) of FIG. 3 indicates the position of a peak shown in (a), and (d) indicates the position of a peak shown in (b). A peak position in a cross power spectrum is expressed as ($\Delta x$, $\Delta y$), which becomes a CSV.

Figure 4:
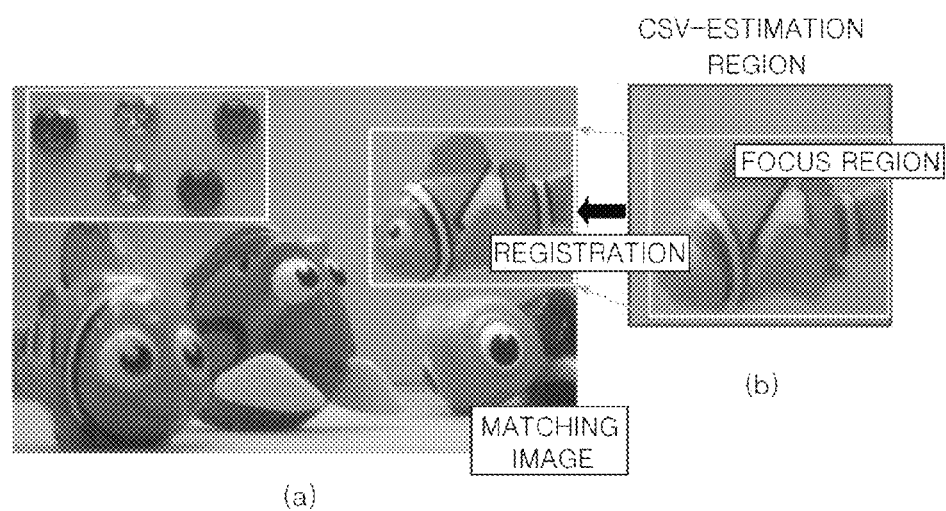
FIG. 4 illustrates an example in which color channels are aligned according to CSVs estimated from an original image.

FIG. 4 illustrates an example in which color channels are aligned according to CSVs estimated from an original image. (a) of FIG. 4 shows an image that is a result in which color channels have been aligned by applying an exemplary embodiment of the present invention to an original image taken by an MCA camera, and in each of two rectangular regions in the image, color channels are aligned using the same CSV. Referring to (b) of FIG. 4, an external region including a region for alignment of color channels is used to estimate a CSV, and pixels included in the internal region are aligned by the estimated CSV.

Figure 5:
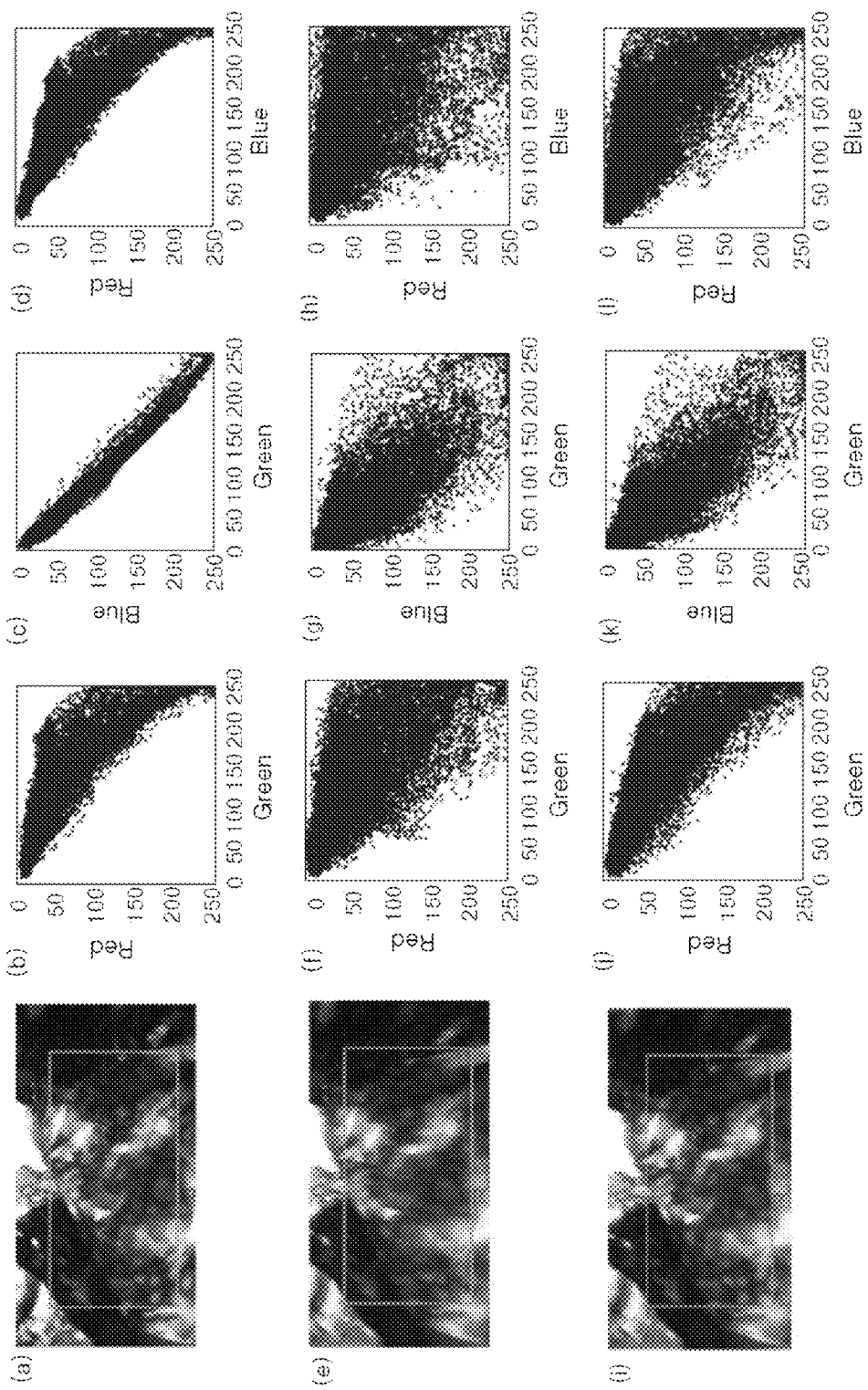
FIG. 5 shows endoscopic color images and joint histograms corresponding to the images.

Color shift model-based PCM set forth above can also be applied to align color channels of a temporally sampled endoscopic image. Specifically, it is assumed that a properly divided region only includes a shift between color channels, and alignment can be performed through PCM. FIG. 5 shows endoscopic color images and joint histograms corresponding to the images. (a) of FIG. 5 is an endoscopic image in which color channels have been perfectly aligned, and (b) to (d) are joint histograms between the color channels. (e) of FIG. 5 is an image resulting from misalignment of color channels, and (f) to (h) are joint histograms corresponding to the image. (i) of FIG. 5 is a result in which color channels in the image of (e) of FIG. 5 have been aligned by PCM, and it is possible to check that (j) to (l), which are joint histograms corresponding to the result, are concentrated in smaller areas than before alignment of the color channels.

Figure 6:
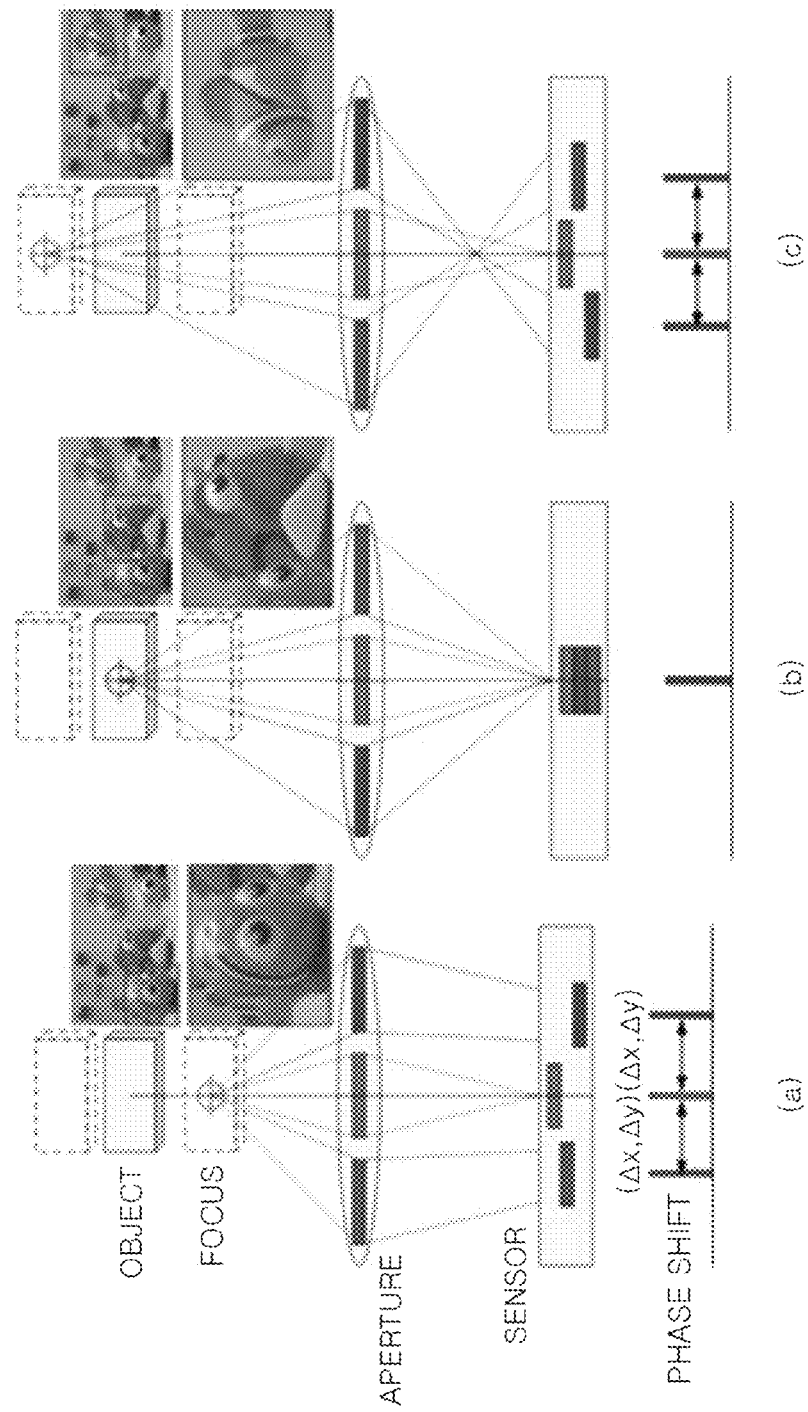
FIG. 6 shows examples of CSVs estimated differently according to focal positions.

As mentioned above, a CSV varies according to the focal position of an MCA camera. FIG. 6 shows examples of CSVs estimated differently according to focal positions. (a) shows a short-distance focal position, (b) shows a case in which a focal position is the same as the position of an object, and (c) shows a long-distance focal position. In the aperture of an MCA camera, each opening deviates from the optical center, and thus there is the problem of misalignment of color channels as shown in FIG. 6. At this time, estimation of a CSV between color channels expressed as ($\Delta x$, $\Delta y$) enables estimation of depth information on an object and also setting of multiple focuses.

Figure 7:
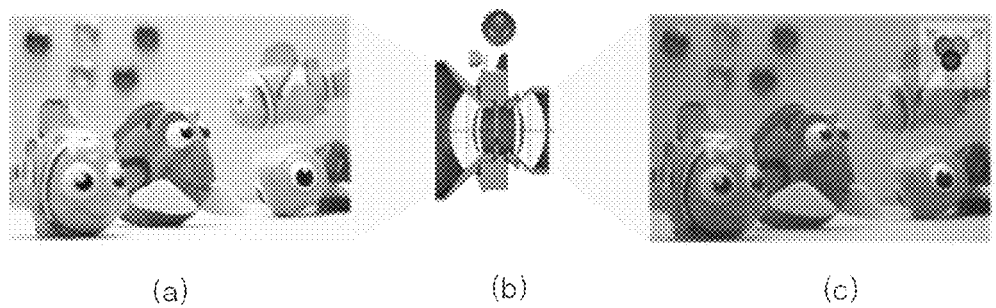
FIG. 7 illustrates a method of obtaining an image using a single-sensor MCA camera.

FIG. 7 illustrates a method of obtaining an image using a single-sensor MCA camera. Referring to FIG. 7, by an optical system of an MCA camera equipped with a plurality of color filters as shown in (b), a plurality of objects present at different distances from a camera as shown in (a) are shown as an image out of focus as shown in (c) due to misalignment between color channels.

The apparatus for aligning color channels according to an exemplary embodiment of the present invention aligns color channels using a two-dimensional (2D) translation model with respect to a projection plane induced by three-dimensional (3D) camera motion. When a pixel corresponding to a position (x, y) in one color channel shifts to a position (x', y') in another color channel, such translation may be expressed as shown in Equation 5 below.

$$\begin{bmatrix} x' \\ y' \\ 1 \end{bmatrix} = \begin{bmatrix} 1 & 0 & \Delta x \\ 0 & 1 & \Delta y \\ 0 & 0 & 1 \end{bmatrix} \begin{bmatrix} x \\ y \\ 1 \end{bmatrix}$$ [Equation 5]

Here, ($\Delta x$, $\Delta y$) is a CSV of the corresponding pixel between color channels. In (c) of FIG. 7, the degree of movement of each color channel is indicated by an arrow.

As described above, a CSV is spatially variable and thus varies according to each pixel of an original image. However, by properly dividing the original image into regions having an adequate size to which the same CSV can be applied, it is possible to perform non-rigid image registration.

Thus, the image divider 110 of the apparatus for aligning color channels according to an exemplary embodiment of the present invention divides a binary image generated from an original image into a plurality of ROIs corresponding to respective objects included in the original image. To this end, the image divider 110 separates a foreground region in which an object is present and a background region from the original image before dividing the original image into the ROIs. Also, a preprocess such as filtering or de-blurring may be performed to obtain better results.

Figure 8:
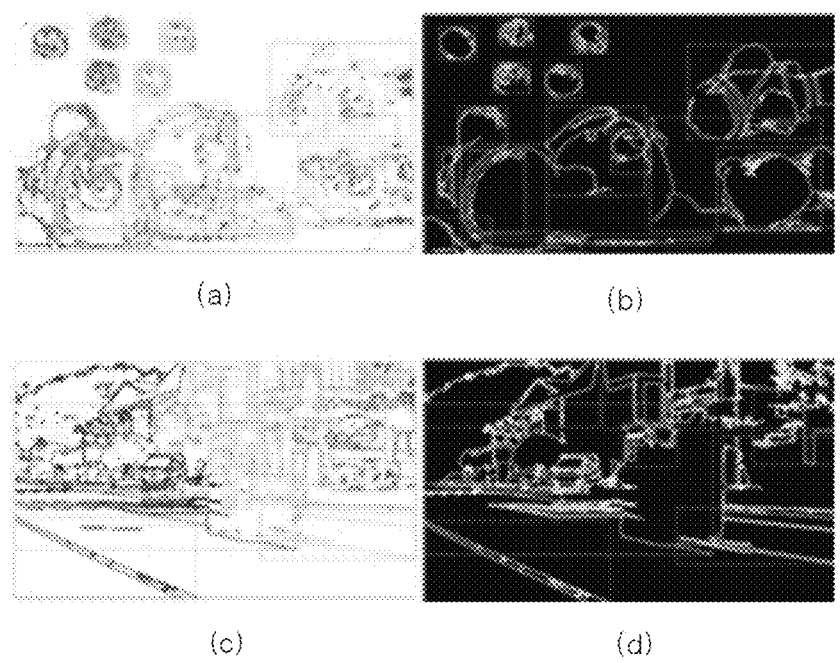
FIG. 8 shows results of a labeling process.

Information included in the binary image obtained from the original image is expressed by sizes, shapes and positions of components connected with each other in the foreground region. To divide the original image into the plurality of ROIs, the image divider 110 generates a label map in the form of a matrix having the same size as the original image through a component labeling process for the binary image. The label map includes pixels constituting a specific object. When a pixel satisfies a condition of pixel $(LI_k)<TH$, the pixel belongs to the background region. Otherwise, the pixel belongs to the foreground region. FIG. 8 shows results of a labeling process. (a) and (c) of FIG. 8 show results of a labeling process, and (b) and (d) show results of a labeling process whereby binary images have been divided into a plurality of ROIs.

The shifting vector estimator 120 separately estimates CSVs of the respective ROIs of the original image divided through such a labeling process. A CSV may be specified by length and angle information. The length and angle of a CSV corresponding to the position of each object are calculated based on Equation 6 and Equation 7 below, respectively.

$$L_i = \sqrt{(\Delta x)^2 + (\Delta y)^2} \quad [\text{Equation 6}]$$

$$\theta_i = \tan^{-1}\left(\frac{\Delta x}{\Delta y}\right) \quad [\text{Equation 7}]$$

In Equation 6 and Equation 7, $i \in \{GR, GB\}$. In other words, i=GR denotes a CSV between the G channel and the R channel, and i=GB denotes a CSV between the G channel and the B channel.

From Equation 7, an angle difference between a GR color channel and a GB color channel may be defined as Equation 8 below.

$$\theta_D = |\theta_{GR} - \theta_{GB}| \quad [\text{Equation 8}]$$

When three openings formed in an aperture of an MCA camera are disposed in the form of an equilateral triangle, an angle of Equation 8 is theoretically 60°. Thus, when the position of an object is closer or farther than a focal position with respect to the MCA camera as shown in FIG. 6, a CSV of the GR color channel and a CSV of the GB color channel cross each other at an angle of 60°.

Figure 9:
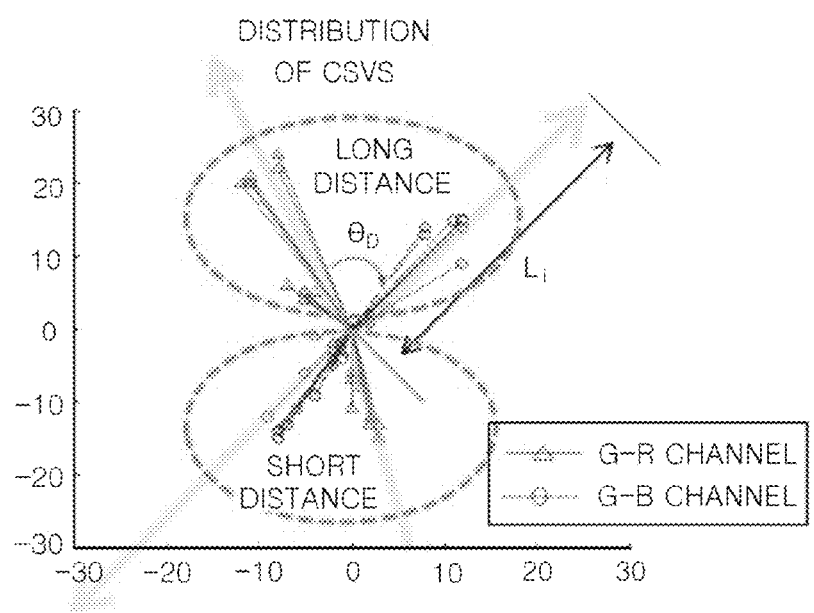
FIG. 9 is a graph showing the distribution of CSVs actually estimated for an object present closer than a focal point and an object present farther than the focal point.

FIG. 9 is a graph showing the distribution of CSVs actually estimated for an object present closer than a focal point and an object present farther than the focal point. It can be seen that, when CSVs estimated for a plurality of objects are averaged, an angle between average CSVs becomes close to 60°.

Figure 10:
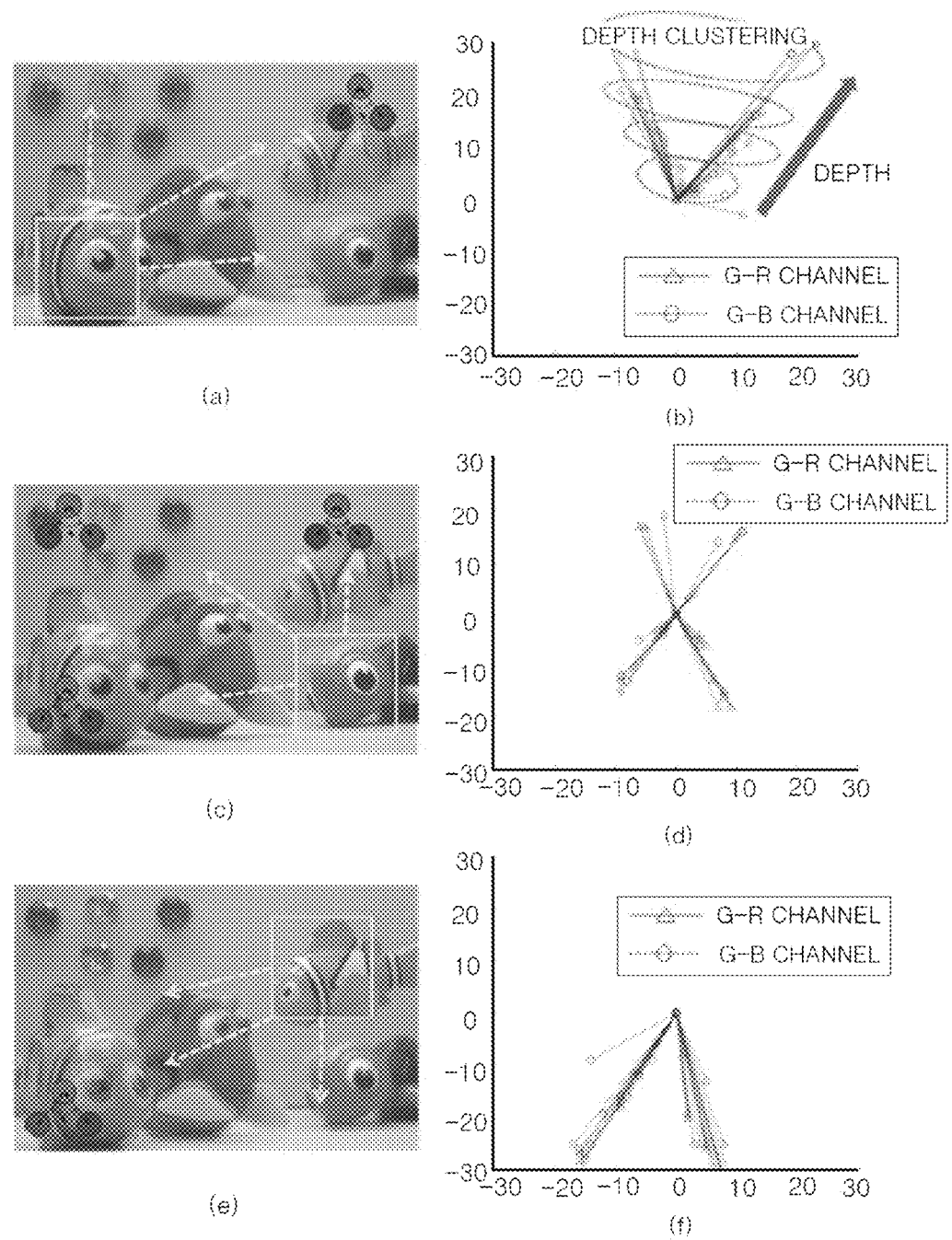
FIG. 10 shows the distribution of CSVs estimated in a focus region of an image and other regions of the image according to the region.

FIG. 10 shows the distribution of CSVs estimated in a focus region of an image and another region of the image according to the region. Rectangular regions in (a), (c) and (e) of FIG. 10 are focus regions, and focus is set on objects present at different distances from an MCA camera. (b), (d) and (f) of FIG. 10 represent CSVs estimated in a focus region of (a), (c) and (e), respectively.

Referring to (b) of FIG. 10, it can be seen that, since focus is set on an object present at the closest position from the MCA camera, all the corresponding CSVs are directed upward in the graph. On the other hand, (e) of FIG. 10 shows that CSVs are directed downward in the graph since focus is set on an object present at the farthest position from the MCA camera. Referring to (d) of FIG. 10, the CSVs are directed both upward and downward.

Meanwhile, the length of a CSV is in proportion to a distance from a focal position, and this characteristic can be used to estimate the depth of an object present in a focus region. (b) of FIG. 10 shows results obtained by performing depth clustering on CSVs classified according to their lengths.

As mentioned above, a CSV is specified by length and angle information. Thus, the shifting vector estimator 120 estimates a CSV between color channels according to respective ROIs obtained from an original image using a method as described above. When the angle and length of an estimated CSV exceed a predetermined reference, the shifting vector estimator 120 may determine that the corresponding ROI is an incorrectly set region, that is, not a target for color channel alignment, and remove the ROI from a label map.

Figure 11:
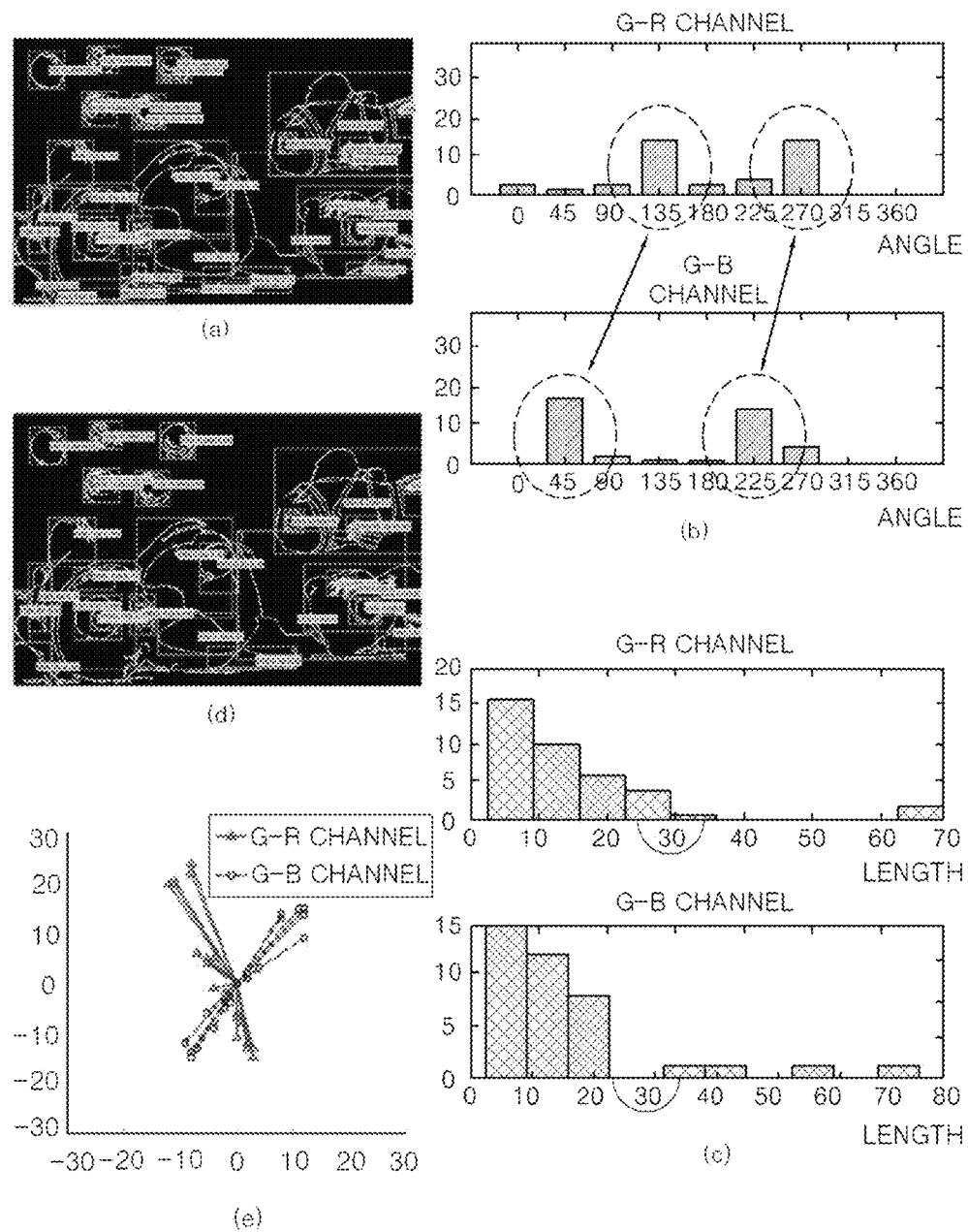
FIG. 11 illustrates an example of determining a region to be a target for color channel alignment using CSVs of a label map generated by dividing an original image.

FIG. 11 illustrates an example of determining a region to be a target for color channel alignment using CSVs of a label map generated by dividing an original image. (a) of FIG. 11 is a label map generated according to a binary image of an original image using a method as described above, (b) shows normalized histograms of angle information on GR CSVs and GB CSVs estimated in respective ROIs, (c) shows normalized histograms of length information on the GR CSVs and the GB CSVs estimated in the respective ROIs, (e) is a graph showing the distribution of the estimated CSVs, and (d) is a label map showing ROIs finally selected on the basis of the angle and length information on the CSVs.

Comparing (a) of FIG. 11 with (d), it can be seen that some of labeled ROIs have been removed from the label map. An angle between bins indicated by circles in the two histograms of (b) of FIG. 11 is about 60° as shown in (e) of FIG. 11 also. Thus, among the labeled ROIs, an ROI having an angle between the corresponding GR CSV and GB CSV exceeding 60° or a predetermined reference range from 60° may be removed from the label map. Also, reference values for the lengths of CSVs estimated according to the respective ROIs may be set to the sizes of the ROIs, and among the ROIs, an ROI having the length of a CSV greater than the size of the ROI may be removed from the label map.

Figure 12:
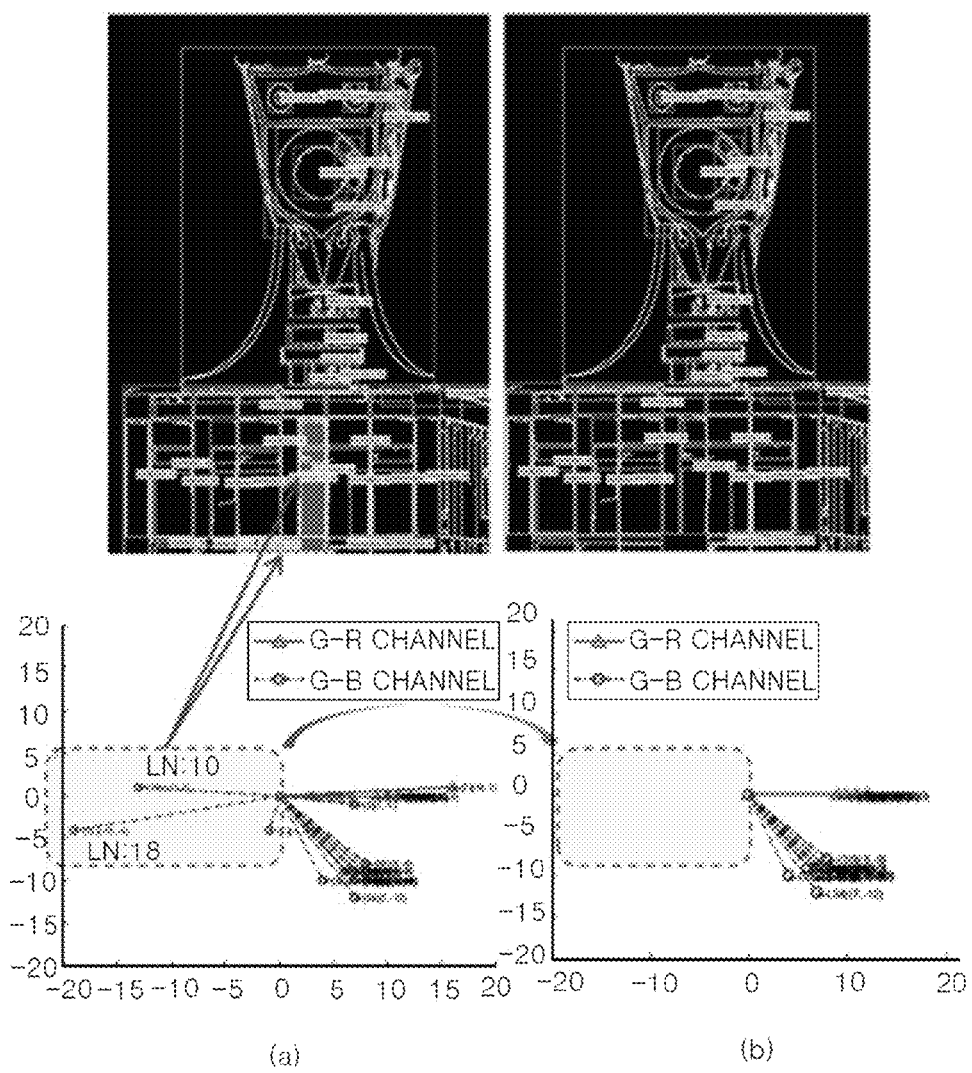
FIG. 12 shows another example of a label map from which a region of interest (ROI) is removed on the basis of characteristics of CSVs.

FIG. 12 shows another example of a label map from which an ROI is removed on the basis of characteristics of CSVs. A graph of (a) in FIG. 12 shows CSVs obtained according to respective ROIs of a label map shown on the upper left side. It can be seen from the graph that CSVs of ROIs corresponding to label numbers 10 and 18 are directed to a different direction than other CSVs. Thus, the ROIs are not targets for color channel alignment and are removed from the label map. A graph of (b) in FIG. 12 shows CSVs obtained according to respective ROIs of a label map shown on the upper right side. Since the incorrectly set ROIs are removed from the label map, all CSVs satisfy an angle condition.

On the basis of a label map as described above, the channel matching unit 130 generates a plurality of matched images in which color channels have been aligned using CSVs estimated according to respective ROIs.

Figure 13:
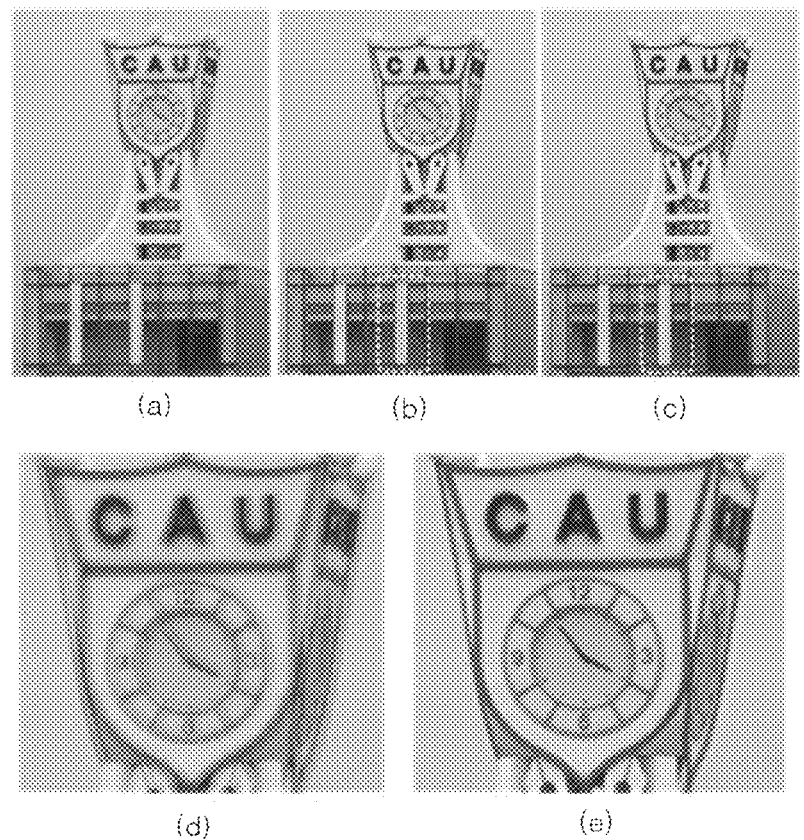
FIG. 13 shows an example of color channel alignment based on an ROI.

FIG. 13 shows an example of color channel alignment based on an ROI. (a) of FIG. 13 is an original image in which misalignment of color channels is shown, and a region of the original image in which the most severe channel misalignment is shown is enlarged and shown in (d) of FIG. 13. (b) of FIG. 13 is a multi-focus image generated by the apparatus for aligning color channels according to an exemplary embodiment of the present invention. In (b), a region is shown in which color channels are incorrectly aligned because the above-described process of removing an inappropriate ROI from a label map has not been performed. (c) of FIG. 13 is a multi-focus image in which an inappropriate ROI has been removed and color channel alignment has been correctly performed. (d) and (e) are enlarged images of the same regions in (b) and (c), and it can be seen that focus has been accurately set in the enlarged region since an inappropriate ROI has been removed.

Figure 14:
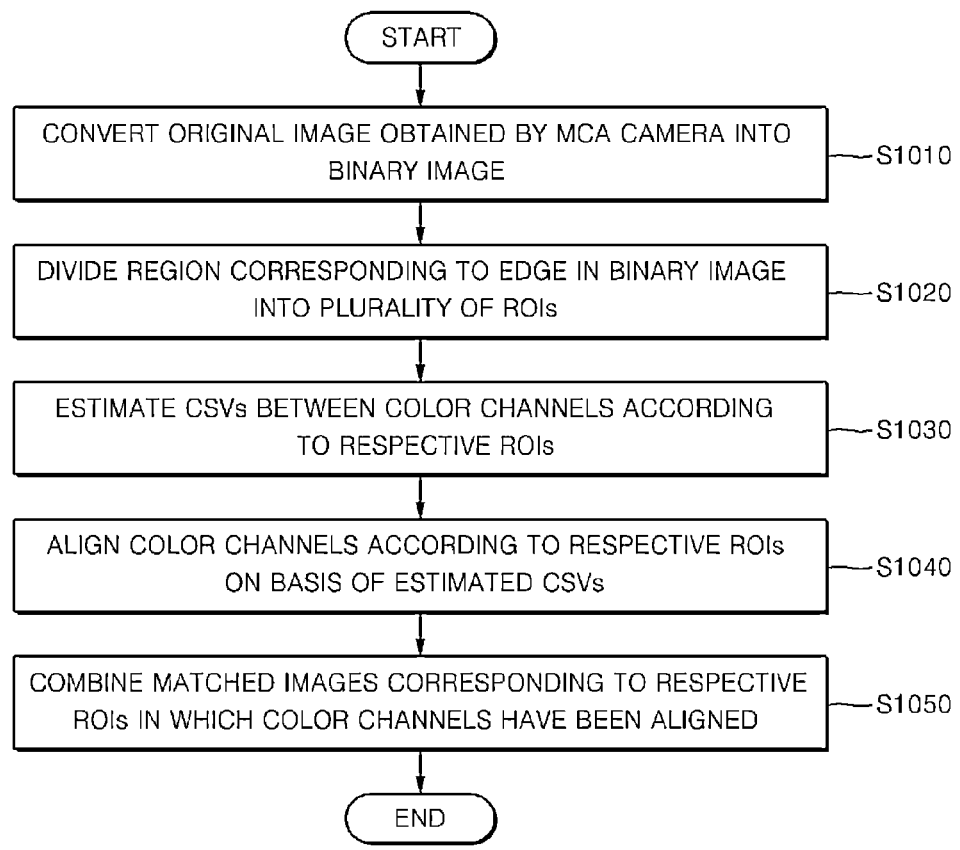
FIG. 14 is a flowchart illustrating a method of aligning color channels on the basis of depth information taken by an imaging device equipped with an MCA according to an exemplary embodiment of the present invention.

FIG. 14 is a flowchart illustrating a method of aligning color channels on the basis of depth information taken by an imaging device equipped with an MCA according to an exemplary embodiment of the present invention.

Referring to FIG. 14, the image divider 110 converts an original image obtained by an MCA camera into a binary image (S1010), and divides a foreground region corresponding to a plurality of objects included in the original image into a plurality of ROIs on the basis of edge information on the binary image (S1020). At this time, a label map is generated with the same size as the original image having the respective ROIs to which different labels are given through a component labeling process.

The shifting vector estimator 120 estimates CSVs through PCM between color channels according to the respective ROIs (S1030), and additionally removes an ROI having a CSV exceeding a predetermined reference range from the label map on the basis of angle and length information on the CSVs.

The channel matching unit 130 generates a plurality of matched images corresponding to the respective ROIs included in the label map by aligning the color channels using the respective CSVs estimated according to the respective ROIs, and generates a multi-focus image by combining the matched images (S1050).

An experiment was conducted to evaluate the performance of an exemplary embodiment of the present invention. A variety of test images obtained by an MCA camera were used for the experiment, and the MCA camera used in the experiment is shown in FIG. 15. Detailed hardware information on the MCA camera is shown in table 1 below.

TABLE 1

| Camera | DSLR-A | DSLR-B |
|---|---|---|
| R, G, B filter | Green-K-Wratten Filter No. 58 | |
| | Blue-K-Wratten Filter No. 47 | |
| | Red-K-Wratten Filter No. 25 | |
| Focus | F-5.6 | F-1.0 |
| Sensor | 23.7 × 15.6 mm RGB CCD | 22.2 × 14.8 mm RGB CCD |
| Lens mount | S-Apo-Tele-Xnear | |
| | Relative aperture focal length-5.6/250 | |
| Exposure time | 1/5 second | 1/25, 1/15 second |
| Color mode | Triple mode for RGB channels | |

FIG. 16 shows experimental results obtained using a digital single lens reflex (DSLR)-A camera. It is assumed that regions centered on focal pixels are classified as shown in (a) of FIG. 16. (a) of FIG. 16 is an original image obtained by the MCA camera, and includes a plurality of objects out of focus. From a result obtained by aligning color channels according to an exemplary embodiment of the present invention, it can be seen that focus has been set on all the plurality of objects as shown in (b) of FIG. 16. In regions enlarged and shown in (c) of FIG. 16, picture quality deteriorates due to overlap of regions. By more appropriately classifying regions corresponding to the focal pixels, such deteriorated picture quality can be improved as shown in (d) of FIG. 16.

Figure 17:
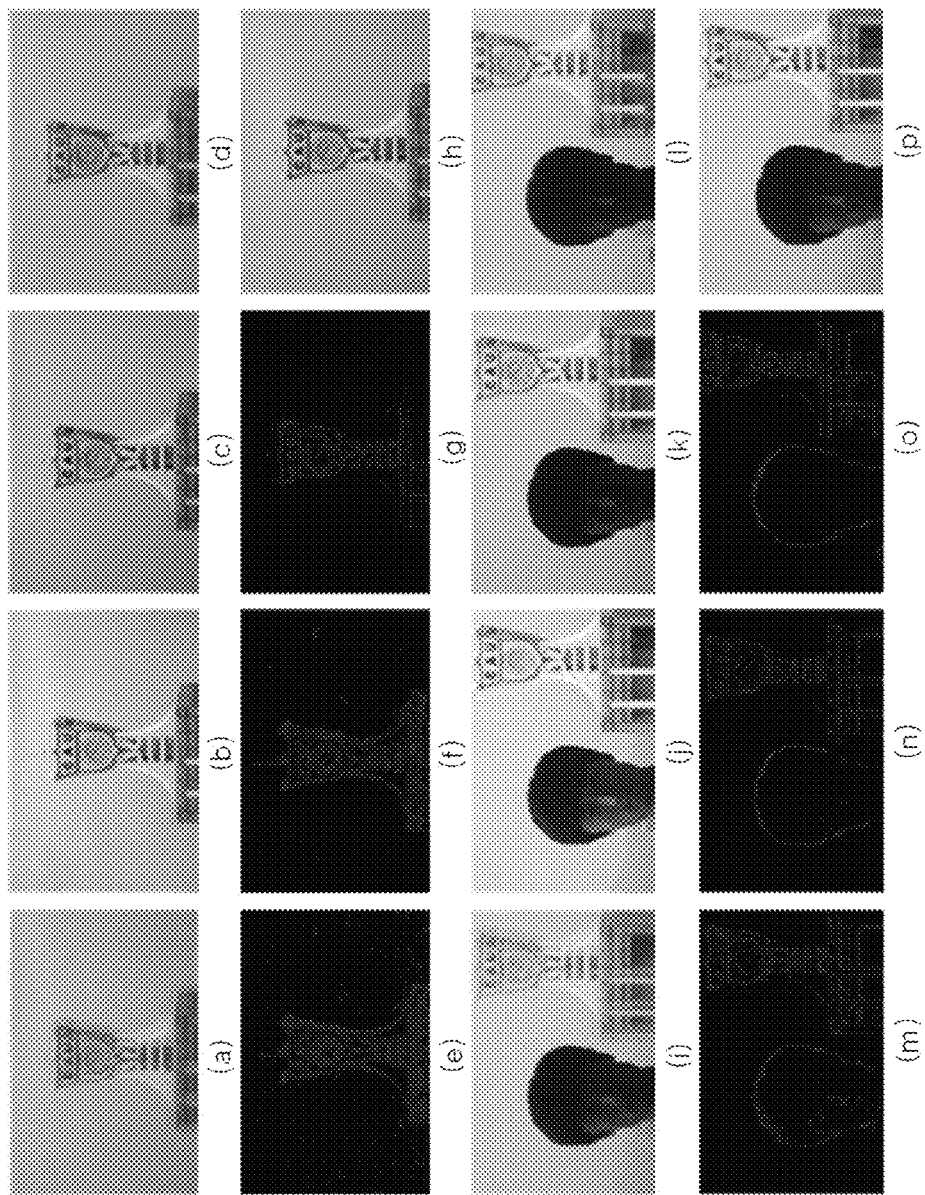
FIG. 17 shows results of another experiment in which color channel alignment was performed according to an exemplary embodiment of the present invention.

FIG. 17 shows results of another experiment in which alignment of color channels was performed according to an exemplary embodiment of the present invention. Both (a) and (i) of FIG. 17 are original images taken by an MCA camera and in which color channels are misaligned. R, G and B channels of these original images are shown in (b) to (d) and (j) to (l) of FIG. 17, respectively. Also, (e) to (g) and (m) to (o) of FIG. 17 show binary images of R, G and B channels, respectively. Multi-focus images generated by aligning color channels according to an exemplary embodiment of the present invention are shown in (h) and (p) of FIG. 17, respectively. In comparison with (a) and (i), that is, the original images, it can be seen that focus has been set on all parts of the images.

In an apparatus and method for aligning color channels on the basis of depth information on an image taken by an imaging device equipped with an MCA according to an exemplary embodiment of the present invention, the image is divided according to a plurality of objects present at different distances, and shifting vectors of color channels are automatically estimated according to respective ROIs, so that a multi-focus image focusing on all the plurality of objects can be generated. Also, by excluding an incorrectly determined ROI from targets for color channel alignment on the basis of characteristics of CSVs estimated in the respective ROIs, it is possible to increase the accuracy of color channel alignment.

Exemplary embodiments of the present invention can be embodied as computer-readable codes on a computer-readable recording medium. The computer-readable recording medium includes all kinds of recording devices storing data which can be read by computer systems. Examples of computer-readable recording media include a read-only memory (ROM), random-access memory (RAM), compact disc (CD)-ROM, magnetic tape, floppy disk, and optical data storage, and further include an implementation in carrier waves (e.g., transmission over the Internet). Also, the computer-readable recording medium may be distributed among computer systems connected through a network and stored and executed as a code that can be read in a de-centralized method.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for aligning color channels, comprising:
an image divider configured to generate a binary image including edge information on an original image taken by an imaging device having different color filters respectively installed in a plurality of openings formed in an aperture, label respective components including pixels connected with each other in the binary image, and thereby generate a label map including a plurality of regions of interest (ROIs) respectively corresponding to a plurality of objects included in the original image;
a shifting vector estimator configured to estimate color shifting vectors (CSVs) indicating shift directions and distances of color channels of the original image according to the respective ROIs on the basis of frequency components of image data constituting the respective ROIs; and
a channel matching unit configured to obtain a plurality of matched images corresponding to the respective ROIs included in the label map by shifting the color channels according to the respective CSVs, and generate a multi-focus image focusing on all the plurality of objects included in the original image by combining the matched images.

2. The apparatus of claim 1, wherein the shifting vector estimator determines a plurality of CSVs, which are shifting vectors of channels other than a reference channel selected from among the color channels, according to each of the ROIs, and removes an ROI having an angle between CSVs and lengths of the CSVs that are not included in a predetermined reference range among the ROIs included in the label map from the label map.

3. The apparatus of claim 2, wherein the shifting vector estimator removes an ROI having an angle between CSVs that is not included in a reference angle range set on the basis of angles formed by the plurality of openings formed in the aperture from the label map.

4. The apparatus of claim 2, wherein the shifting vector estimator removes an ROI having no lengths of CSVs that are included in a reference length range set on the basis of a size of the ROI from the label map.

5. The apparatus of claim 1, wherein red, blue and green color filters are respectively installed in the plurality of openings formed in the aperture, and the color channels of the original image are generated when light incident from the plurality of objects passes through the color filters.

6. A method of aligning color channels performed in an apparatus for aligning color channel of an image taken by an imaging device having different color filters respectively installed in a plurality of openings formed in an aperture, comprising:

an image division step of generating a binary image including edge information on an original image taken by the imaging device having different color filters respectively installed in a plurality of openings formed in the aperture, labeling respective components including pixels connected with each other in the binary image, and thereby generating a label map including a plurality of regions of interest (ROIs) respectively corresponding to a plurality of objects included in the original image;

a shifting vector estimation step of estimating color shifting vectors (CSVs) indicating shift directions and distances of color channels of the original image according to the respective ROIs on the basis of frequency components of image data constituting the respective ROIs; and a channel matching step of obtaining a plurality of matched images corresponding to the respective ROIs included in the label map by shifting the color channels according to the respective CSVs, and generating a multi-focus image focusing on all the plurality of objects included in the original image by combining the matched images, wherein the image division step, shifting vector estimation step, and channel matching step are performed in an apparatus for aligning color channel.

7. The method of claim 6, wherein the shifting vector estimation step includes determining a plurality of CSVs, which are shifting vectors of channels other than a reference channel selected from among the color channels, according to each of the ROIs, and removing an ROI having an angle between CSVs and lengths of the CSVs that are not included in a predetermined reference range among the ROIs included in the label map from the label map.

8. The method of claim 7, wherein the shifting vector estimation step includes removing an ROI having an angle between CSVs that is not included in a reference angle range set on the basis of angles formed by the plurality of openings formed in the aperture from the label map.

9. The method of claim 7, wherein the shifting vector estimation step includes removing an ROI having no lengths of CSVs that are included in a reference length range set on the basis of a size of the ROI from the label map.

10. The method of claim 6, wherein red, blue and green color filters are respectively installed in the plurality of openings formed in the aperture, and the color channels of the original image are generated when light incident from the plurality of objects passes through the color filters.

11. A non-transitory computer-readable media having recorded thereon a program for executing the method of aligning color channels of claim 6.

* * * * *